(12) United States Patent
Pei

(10) Patent No.: US 8,823,635 B2
(45) Date of Patent: Sep. 2, 2014

(54) SYSTEM AND METHOD FOR SETTING BACKGROUND IMAGE OF DISPLAY MODULE

(71) Applicant: Shao-Kai Pei, New Taipei (TW)

(72) Inventor: Shao-Kai Pei, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 81 days.

(21) Appl. No.: 13/660,962

(22) Filed: Oct. 25, 2012

(65) Prior Publication Data

US 2014/0002429 A1 Jan. 2, 2014

(30) Foreign Application Priority Data

Jul. 2, 2012 (TW) .............................. 101123789 A

(51) Int. Cl.
G09G 3/34 (2006.01)

(52) U.S. Cl.
USPC ............................................ 345/106; 345/87

(58) Field of Classification Search
USPC ................... 345/156, 173, 204, 690, 87, 106
See application file for complete search history.

(56) References Cited

U.S. PATENT DOCUMENTS

| 2004/0136083 | A1* | 7/2004 | Wang et al. | 359/642 |
|---|---|---|---|---|
| 2004/0140965 | A1* | 7/2004 | Wang et al. | 345/179 |
| 2011/0282476 | A1* | 11/2011 | Hegemier et al. | 700/100 |
| 2014/0035720 | A1* | 2/2014 | Chapman | 340/5.51 |

* cited by examiner

Primary Examiner — Ricardo L Osorio
(74) Attorney, Agent, or Firm — Novak Druce Connolly Bove + Quigg LLP

(57) ABSTRACT

A system for setting a background image of a display module includes a housing. The housing defines a receiving space, a first hole and a second hole. The first hole and the second hole are communicated with the receiving space. The system further includes the display module received in the first hole, a transparent cover received in the second hole, a thermo-sensitive ink layer coated on the transparent cover, a camera positioned beneath the transparent cover, and a controller received in the receiving space. The camera is configured for capturing an image of the thermo-sensitive ink layer. The controller is configured for taking the image captured by the camera as the background image of the display module.

7 Claims, 3 Drawing Sheets

SYSTEM AND METHOD FOR SETTING BACKGROUND IMAGE OF DISPLAY MODULE

BACKGROUND

1. Technical Field

The present disclosure relates to a system and a method for setting a background image of a display device.

2. Description of Related Art

Display modules of electronic devices, such as mobile phones, usually display a background image when working. When a user wants to change the background image, the user must choose an image first then set the image as the background image. It is time consuming and inconvenient.

Therefore, it is desired to provide a system and a method for setting a background image of a display module which can overcome the above-mentioned problem.

DETAILED DESCRIPTION

Figure 1:
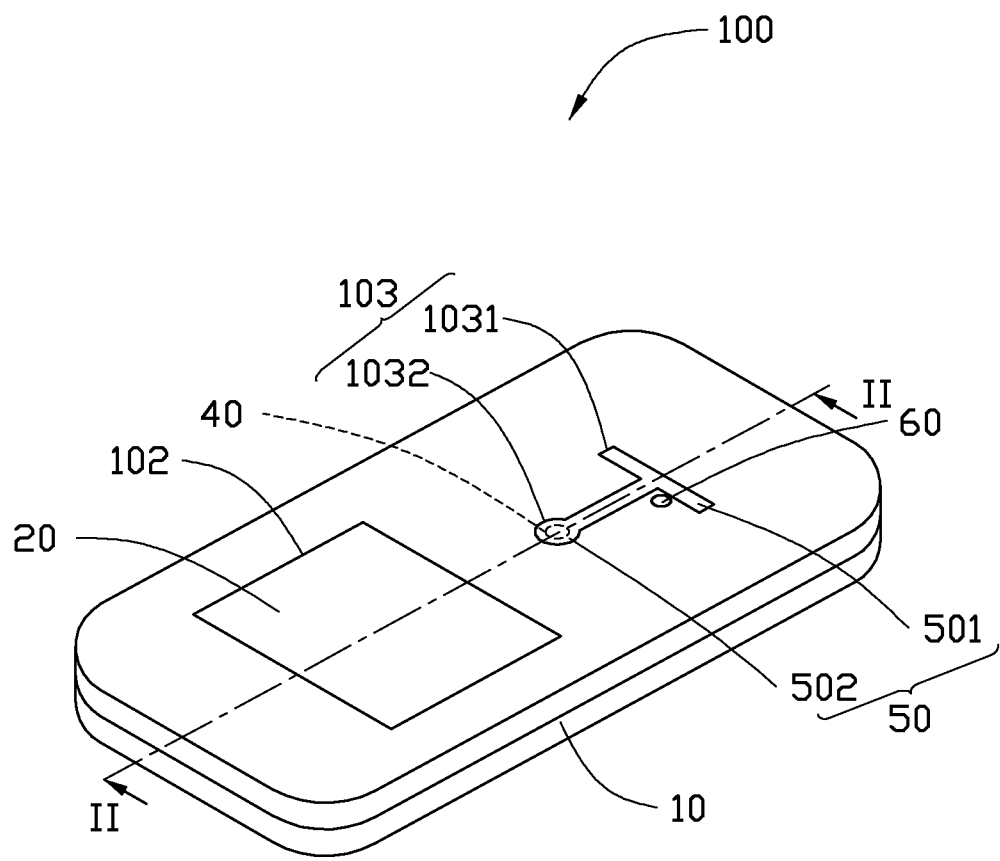
FIG. 1 is a schematic, isometric view of a system for setting a background image of a display module according to a first embodiment.
Figure 2:
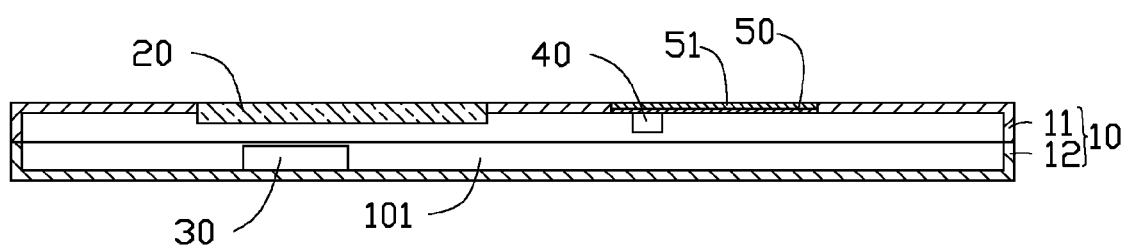
FIG. 2 is a cross-sectional view taken along II-II line of the system of FIG. 1.

FIGS. 1 and 2 show a system 100 for setting a background image of a display module according to a first embodiment. The system 100 includes a housing 10, a display module 20, a controller 30, a camera 40, a transparent cover 50, and a switch 60.

The housing 10 is a housing of an electronic device, for example, a housing of a mobile phone. The housing 10 includes an upper part 11 and a bottom part 12. The housing 10 is made of plastic. The upper part 11 and the bottom part 12 cooperatively form a receiving space 101. The controller 30 is received in the receiving space 101. The upper part 11 further defines a first hole 102 and a second hole 103 communicating with the receiving space 101 respectively. The first hole 102 is rectangular. The display module 20 is received in the first hole 102. The second hole 103 includes a T-shaped hole 1031 and a circular hole 1032. The circular hole 1032 is positioned on an end of the T-shaped hole 1031.

The shape of the transparent cover 50 is consistent with the shape of the second hole 103. The transparent cover 50 includes a T-shaped portion 501 and a circular portion 502. The transparent cover 50 is received in the second hole 103. The T-shaped portion 501 is received in the T-shaped hole 1031. The circular portion 502 is received in the circular hole 1032. The transparent cover 50 is made of glass. A thermo-sensitive ink layer 51 is coated on the transparent cover 50. The camera 40 is positioned beneath the circular portion 502. The camera 40 is configured for capturing images through the transparent cover 50 and the thermo-sensitive ink layer 51.

The switch 60 is a button. The button 60 is positioned on the housing 10 adjacent to the T-shaped portion 501 of the transparent cover 50. The button 60 is configured for triggering the camera 40 to capture an image.

When working, the controller 30 controls the display module 20 to display a background image. When a user wants to change the background image, the user presses the T-shaped portion 501 of the transparent cover 50 by a finger. The temperature of the finger changes the color of the thermo-sensitive ink layer 51. As the button 60 is adjacent to the T-shaped portion 501, when the user presses the T-shaped portion 501, the user presses down the button 60 at the same time. When pressed down, the button 60 triggers the camera 40. The camera 40 captures an image of the thermo-sensitive ink layer 51, then sends the captured image to the controller 30. The controller 30 replaces the background image displayed in the display module 20 with the captured image.

Figure 3:
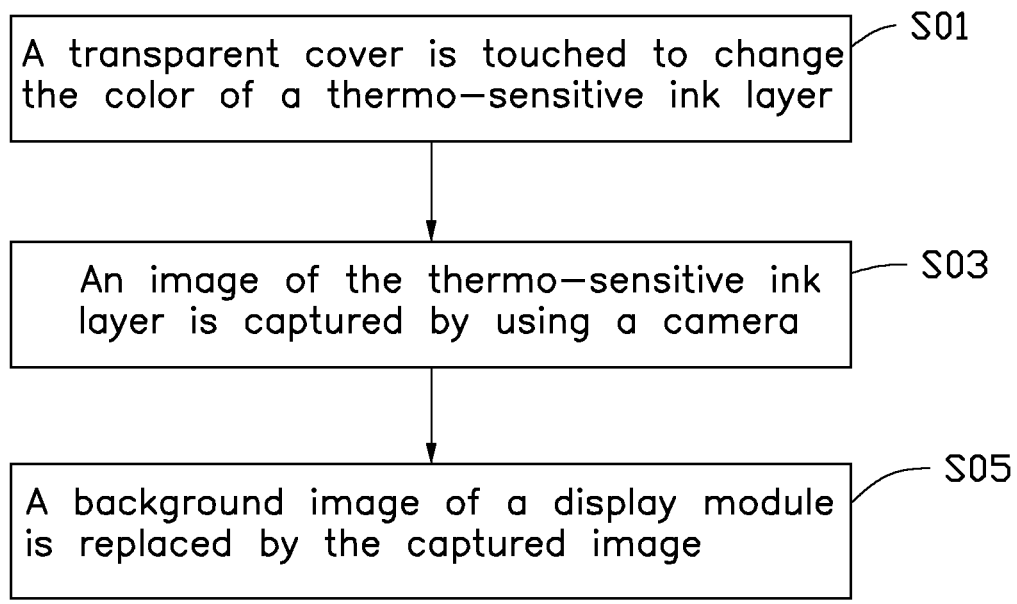
FIG. 3 is a flowchart of a method for setting a background image of a display module according to a second embodiment.

Referring to FIG. 3, a method for setting the background image of the display module 20 is disclosed. The method uses the system 100. The method includes steps described below.

In step S01, the transparent cover 50 is touched to change the color of the thermo-sensitive ink layer 51. In step S03, the camera 40 captures an image of the thermo-sensitive ink layer 51. In step S05, the background image of the display module 20 is replaced by the captured image.

The background image of the display module 20 can be replaced simply by touching the transparent cover 50. Thus, the method for setting the background image of the display module is efficient and convenient.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A system for setting a background image of a display module, the system comprising:
   a housing defining a receiving space, a first hole and a second hole, the first hole and the second hole being communicated with the receiving space;
   the display module received in the first hole;
   a transparent cover received in the second hole;
   a thermo-sensitive ink layer coated on the transparent cover;
   a camera positioned beneath the transparent cover, the camera being configured for capturing an image of the thermo-sensitive ink layer; and
   a controller received in the receiving space, the controller being configured for taking the image captured by the camera as the background image of the display module.

2. The system of claim 1, further comprising a switch for triggering on the camera.

3. The system of claim 2, wherein the switch is positioned adjacent to the transparent cover.

4. The system of claim 1, wherein the transparent cover comprises a T-shaped portion and a circular portion, and the camera is positioned beneath the circular portion.

5. The system of claim 1, wherein the transparent cover is made up of glass.

6. The system of claim 1, wherein the housing is made up of plastic.

7. A method for setting a background image of a display module, comprising:
   providing a system as claimed in claim 1;
   touch the transparent cover to change a color of the thermo-sensitive layer;
   capturing an image of the thermo-sensitive layer by using the camera; and taking the captured image as the background image of the display module by using the controller.

* * * * *